Patented July 3, 1945

2,379,769

UNITED STATES PATENT OFFICE 2,379,769

RUBBER COMPOSITIONS AND METHOD FOR RETARDING THE DETERIORATION OF RUBBER

Jerome R. Vinograd, Berkeley, Calif., assignor to Shell Development Company, San Francisco, Calif., a corporation of Delaware No Drawing. Application January 26, 1944, Serial No. 519,980

19 Claims. (Cl. 260—809)

This invention relates to the preservation of rubber and rubber-like materials. More particularly, the invention provides aqueous dispersions which are suitable for use as anti-oxidants in natural and synthetic rubber and rubber-like materials and to a process for their preparation. The invention also provides improved stabilized rubber and rubber-like materials and a process for their preparation.

It is well known that rubber compositions are subject to deterioration upon aging, especially when they are exposed to the action of light, heat and/or air. It is common practice to retard or inhibit such deterioration of rubber by the incorporation of various amounts of rubber anti-oxidants. Commonly used anti-oxidants are phenolic compounds, aromatic amino compounds, the condensation products of aldehydes and amines, and the like. Such anti-oxidant materials are customarily incorporated into the rubber composition by milling them into rubber which has been first precipitated from rubber latex by the addition thereto of a coagulating agent, e. g. dilute acetic acid or an aqueous solution of sodium chloride, and then washing and drying the precipitated rubber. Incorporation of the anti-oxidant into the rubber composition in this manner has the disadvantage that oxidative decomposition of the rubber may have already started prior to the addition of the anti-oxidant and may have already progressed to an extent sufficient to have deleteriously affected the properties of the finished rubber. Incorporation of the anti-oxidant into the rubber by milling has the added disadvantage that it is very difficult, and even impossible, to obtain the desired degree of dispersion of the anti-oxidant in the rubber.

It is also known that rubber and rubber-like materials may be stabilized by the addition of an anti-oxidant, in the form of an aqueous suspension, to the latex prior to precipitation of the rubber therefrom. This procedure has not, however, proved entirely satisfactory when carried out by the prior art methods largely because of inherent defects in the aqueous dispersions of the anti-oxidants available for use. The available aqueous dispersions of the anti-oxidants are either so unstable that their handling and use are too difficult and costly, or they are not sufficiently concentrated with respect to the anti-oxidant to make their use on a commercial scale sufficiently attractive and economical. Furthermore, the use of the anti-oxidant suspensions of the prior art has not resulted in the formation of a precipitated rubber wherein the anti-oxidant content is present in sufficiently finely divided form and in a high degree of dispersion and wherein it is uniformly distributed throughout the rubber mass.

It has now been discovered that these difficulties may be overcome by using certain novel and stable anti-oxidant compositions which in the broadest aspect of the invention may be prepared by incorporating a soap-like colloidal electrolyte in a molten anti-oxidant and contacting the resulting mixture of soap-like colloidal electrolyte in anti-oxidant with water containing a dispersing agent. More specifically stated, the present invention resides in the discovery that stable anti-oxidant compositions useful in the preservation of rubber may be prepared by incorporating a soap-like colloidal electrolyte, e. g. the alkali metal salt of a higher fatty acid, sulfonated castor oil, an alkyl sulfonate, and the like, in a molten anti-oxidant, e. g. an aromatic amine such as phenyl naphthylamine; contacting the resulting mixture of soap-like colloidal electrolyte in molten anti-oxidant with water containing a dispersing agent, e. g. sodium alginate; and stirring or otherwise agitating the product in order to secure the desired uniform and stable dispersion of the anti-oxidant in water. The dispersions obtained in this manner contain a large proportion of particles so small as to be colloidal in character. As a result, the dispersions are exceptionally stable and show but little tendency toward agglomeration even when allowed to stand for long periods of time. This property makes them easy to use and insures an even distribution of the anti-oxidant throughout the rubber mass.

It has been further discovered that when the aqueous dispersions of anti-oxidant described above are incorporated into rubber, they result in the formation of especially stable rubber compositions because the dispersions are of such a nature as to be capable of being added directly to rubber latex before the latex is coagulated and further treated to form the said rubber compositions and before the oxidative processes responsible for the deterioration of rubber have set in to any appreciable degree. The rubber compositions stabilized with the anti-oxidant dispersions of the present invention are also particularly resistant to oxidation because, as pointed out hereinabove, the particles of anti-oxidant are extremely small and may be distributed throughout the rubber composition with great uniformity. It is preferred to incorporate the anti-oxidant dispersions in the rubber compositions by intimately mixing rubber latex with the desired or optimum amount of anti-oxidant suspension and then coagulating the rubber by adding a salt solution or other suitable coagulating agent to the resulting mixture of rubber latex and anti-oxidant dispersion. This procedure insures the even distribution of anti-oxidant throughout the rubber and also minimizes the formation of oxidation products. In addition, since the suspension of anti-oxidant in rubber latex resulting from adding the aqueous dispersions of anti-oxidant of the invention to a quantity of rubber latex are stable and show no tendency toward settling even after long periods of standing, it is possible to add the anti-oxidant dispersions to the rubber latex long before the latex is coagulated, thereby preventing oxidation of the rubber latex during storage.

Rubber compositions into which the anti-oxidant content has been incorporated in this manner, i. e. by adding to rubber latex a suitable amount of the anti-oxidant dispersions of the present invention and subsequently precipitating the stabilized rubber, are superior to ordinary rubber compositions in that the anti-oxidant content is present in very finely divided form and is evenly distributed throughout the entire rubber mass. This makes the composition unusually resistant to oxidation due to the action of heat, light and/or air and imparts increased durability to the rubber goods. Since in many cases the plasticity of a rubber product is a reliable criterion of its suitability for many of its possible applications, the improved qualities of the presently disclosed compositions may be illustrated by the results of plasticity tests carried out on butadiene-acrylonitrile rubber samples which were prepared (a) without added anti-oxidant, (b) with added anti-oxidant (phenyl naphthylamine mixture) prepared by the orthodox methods and (c) with anti-oxidant (phenyl naphthylamine mixture) added in the form of a stable suspension prepared in accordance with the method of the present invention. These tests, which are described in greater detail in the examples given hereinbelow, showed that the samples of crude dry rubber which had been prepared without the addition of anti-oxidant did not cohere on the rubber mill, oxidized relatively rapidly to form an oxidized product which was deep yellow in color, and possessed very inferior plastic properties which could not be satisfactorily measured by the test method employed. The samples which contained the orthodox anti-oxidant mixture showed local yellow discoloration before milling, but after milling showed better plastic properties than did those which contained no anti-oxidant whatsoever, but required a load of 124 pounds per sq. in. to produce a plastic deformation of 0.1" in a 0.25" test sample. The samples which had been stabilized by the anti-oxidant suspensions disclosed herein, however, showed definitely superior plastic properties and required a load of but 84 pounds per sq. in. to produce the same plastic deformation.

Although it is preferred to add the aqueous dispersion of anti-oxidant directly to the rubber latex, as described herein, the invention is not limited in scope to this procedure for incorporating the anti-oxidant in the rubber composition. If desired, the stable anti-oxidant suspensions of the invention may be directly incorporated into the rubber mass resulting from coagulation of the latex. This may be done by stirring, mixing, or milling the suspensions into the rubber using the methods and equipment customarily used in the rubber industry for obtaining an intimate mixture of rubber and compounding materials.

A wide variety of anti-oxidants may be used in the preparation of the presently disclosed novel anti-oxidant suspensions. Suitable anti-oxidants are the amines such as phenyl-alpha-naphthylamine, phenyl-beta-naphthylamine, the ditolylamines, diphenyl-para-phenylene diamine; the hydroxy benzenes and their alkyl derivatives; and the condensation products of aldehydes or ketones with amines such as the condensation product of acetaldehyde and aniline, acetone and aniline, butyraldehyde and aniline and the like.

Suitable water-soluble soaps or soap-like electrolytes which may be incorporated in the molten anti-oxidant include such substances as the organic sulfates, the organic sulfonates and the alkali metal salts of the higher fatty acids. Commercial soaps in finely divided form, Turkey red oil (sulfonated castor oil) and sodium lauryl sulfate are particularly suitable dispersing agents which form especially stable dispersions of anti-oxidant. These may be added to the molten anti-oxidant in any desired proportion, either singly or in admixture with each other. Although a proportion of from about 0.5 to 5.0 parts of soap-like electrolyte to from about 3 to 15 parts of anti-oxidant has been found effective, it is preferred to use about 3 parts of soap-like electrolyte to about 10 parts of anti-oxidant. The soap and anti-oxidant may be mixed together at a temperature high enough to maintain the constituents of the mixture in the molten condition and thus insure thorough incorporation. A temperature of from about 75° C. to about 250° C. will usually be sufficiently high for this purpose, although the temperature required will be largely determined by the melting points of the compounds used. Stirring or shaking may be employed to promote the rapid mixing of the reagents.

Any of the well known stabilizers useful for preventing the settling of colloidal suspension may be used to carry out the process of the invention. Sodium alginate has been used with particular success, but such stabilizers as glue, gelatin, dextrin, blood serum, Irish moss and the like may also be used. The stabilizer may be used in the form of a solution or suspension containing from about 0.5% to about 5.0% of stabilizer and from about 99.5% to about 95% of water or other suitable medium. A preferred stabilizer mixture may be prepared by adding about one part by weight of sodium alginate to about 100 parts by weight of warm water and mixing thoroughly. The suspension or solution of stabilizer is then contacted, preferably with moderate stirring and at elevated temperatures, with the product prepared by melting together the anti-oxidant and soap-like electrolyte in order to prepare the uniform, stable, fine anti-oxidant dispersions described herein.

The term "rubber" is used generically in its broadest sense. It includes caoutchouc, both natural and synthetic balata, gutta percha, rubber isomers, and like products whether or not admixed with fillers, pigments, or vulcanizing or accelerating agents. It also includes compounded and uncompounded synthetic rubber-like polymers such as Buna rubber, GR—S, GR—M, Neoprene, Thiokol, Hycar, Ameripol, Chemigum, and all other polymeric substances having rubber-like properties and customarily designated by the name "synthetic rubber."

The following examples, in which the amounts of the constituents are given in parts by weight, illustrate the invention.

Example I

To prepare an aqueous phenyl naphthylamine dispersion suitable for use as an anti-oxidant in rubber articles and compatible with the aqueous latex from which the rubber articles are derived, three parts of 75% Turkey red oil were added to ten parts of a molten mixture containing 75% of phenyl-alpha-naphthylamine and 25% of phenyl-beta-naphthylamine at a temperature of about 75° C. One part of the resulting composition was added to three parts of an aqueous solution containing about 1% of sodium alginate and maintained at a temperature above the melting point of the anti-oxidant. Upon moderate stirring, a uniform and stable concentrated dispersion resulted. When one part of this dispersion was added to 60 parts of rubber latex, the appearance of the latex changed from uniform creamy white to a uniform pink color. No separation of settling of the anti-oxidant occurred over a period of 30 days as evidenced by the lack of sediment and by the uniformity and stability of the pink coloration. Upon the addition of coagulating agents to the latex containing the dispersed anti-oxidant, the rubber and dispersed anti-oxidant were simultaneously coagulated and a coagulum was obtained throughout which the anti-oxidant was uniformly distributed.

Example II

To test the effect of the novel anti-oxidant mixtures of the present invention on the properties of rubber samples in which they were incorporated, the plastic behavior of test pieces of crude dry rubber, crude dry rubber containing the anti-oxidant composition described in Example I but compounded by merely grinding dry phenylnaphthylamine and adding the ground powder to the latex, and crude dry rubber containing as an anti-oxidant a suspension of phenylnaphthylamines compounded and added to the rubber sample in the manner described in Example I was observed in a plastometer designed to measure the load required to produce a plastic deformation of 0.1" in each sample under controlled conditions. It was found that the unstabilized crude dry rubber turned deep yellow in color after a relatively short drying time due to the formation of oxidation products, and did not cohere on the rubber mill. Its properties could not be satisfactorily measured on the plastometer. The sample which contained the anti-oxidant added as a dry powder to the latex showed local yellow discolorations after drying but possessed better plastic properties. It required a load of 124 lbs. per sq. in. to produce a plastic deformation of 0.1". The third sample, i. e. that which contained a stable phenylnaphthylamine suspension prepared in accordance with the method of the present invention, did not discolor upon drying, showed definitely superior plastic properties and required a load of but 84 lbs. per sq. in. to produce the designated plastic deformation.

I claim as my invention:

1. A process for preparing stable, finely-dispersed anti-oxidant compositions useful in preventing the aging of rubber which process comprises incorporating sulfonated castor oil in molten phenylnaphthylamine and dispersing the resulting product of sulfonated castor oil in molten phenylnaphthylamine in water containing sodium alginate.

2. A process for preparing stable, finely-dispersed anti-oxidant compositions useful in preventing the aging of rubber which process comprises incorporating a higher aliphatic sulfonate in molten phenylnaphthylamine and contacting the resulting product or higher aliphatic sulfonate in molten phenylnaphthylamine with water containing a dispersing agent.

3. A process for preparing stable, finely-dispersed anti-oxidant compositions useful in preventing the aging of rubber which process comprises incorporating an alkali metal salt of a higher fatty acid in molten phenylnaphthylamine and contacting the resulting product of alkali metal salt of a higher fatty acid in molten phenylnaphthylamine with water containing a dispersing agent.

4. A process for preparing stable, finely-dispersed anti-oxidant compositions useful in preventing the aging of rubber which process comprises mixing a detergent selected from the group consisting of higher aliphatic sulfonates and alkali metal salts of higher fatty acids, and phenylnaphthylamine at a temperature higher than the melting point of the phenylnaphthylamine and contacting the resulting product with water containing a dispersing agent.

5. A process for preparing stable, finely-dispersed anti-oxidant compositions useful in preventing the aging of rubber which process comprises melting together a higher aliphatic sulfonate and an aromatic amine, contacting the resulting product of higher aliphatic sulfonate and aromatic amine with water containing a dispersing agent.

6. A process for preparing stable, finely-dispersed anti-oxidant compositions useful in preventing the aging of rubber which process comprises melting together a detergent selected from the group consisting of higher aliphatic sulfonates and alkali metal salts of higher fatty acids, and an anti-oxidant material and contacting the resulting product with water containing a dispersing agent.

7. A stable, finely-dispersed anti-oxidant composition useful in preventing the aging of rubber, said anti-oxidant composition being prepared by incorporating the alkali metal salt of a higher fatty acid in molten phenylnaphthylamine and dispersing the resulting product of alkali metal salt of a higher fatty acid in molten phenylnaphthylamine in water containing a sodium alginate.

8. A stable, finely-dispersed anti-oxidant composition useful in preventing the aging of rubber, said anti-oxidant composition being prepared by incorporating the alkali metal salt of a higher fatty acid in molten phenylnaphthylamine and contacting the resulting product of alkali metal salt of a higher fatty acid in molten phenylnaphthylamine with water containing a dispersing agent.

9. A stable, finely-dispersed anti-oxidant composition useful in preventing the aging of rubber, said anti-oxidant composition being prepared by mixing a detergent selected from the group consisting of higher aliphatic sulfonates and alkali metal salts of higher fatty acids and phenylnaphthylamine at a temperature in excess of the melting temperature of the phenylnaphthylamine, and contacting the resulting product with water containing a dispersing agent.

10. A stable, finely-dispersed anti-oxidant composition useful in preventing the aging of rubber, said anti-oxidant composition being prepared by melting together a higher aliphatic sulfonate and an aromatic amine and contacting the resulting product with water containing a dispersing agent.

11. A stable, finely-dispersed anti-oxidant composition useful in preventing the aging of rubber, said anti-oxidant composition being prepared by melting together a detergent selected from the group consisting of higher aliphatic sulfonates and alkali metal salts of higher fatty acids and an anti-oxidant for rubber and contacting the resulting product with water containing a dispersing agent.

12. The method of preserving rubber which comprises incorporating into rubber latex, a stable, finely-dispersed suspension of anti-oxidant prepared by incorporating an alkali metal salt of a higher fatty acid in molten phenylnaphthylamine, dispersing the resulting product in water containing sodium alginate, and coagulating said rubber latex to form a stable rubber product having its anti-oxidant content evenly distributed throughout the rubber mass.

13. The method of preserving rubber which comprises mixing with rubber latex, a stable, finely-dispersed suspension of anti-oxidant prepared by incorporating a detergent selected from the group consisting of higher aliphatic sulfonates and alkali metal salts of higher fatty acids into phenylnaphthylamine at a temperature in excess of the melting temperature of the phenylnaphthylamine and contacting the resulting mixture with water containing a dispersing agent, said rubber latex being subsequently coagulated to form a stable rubber product having its antioxidant content evenly distributed throughout the rubber mass.

14. The method of preserving rubber which comprises incorporating therein a stable, finely-dispersed suspension of anti-oxidant prepared by melting together a higher aliphatic sulfonate and an aromatic amine and contacting the resulting product of higher aliphatic sulfonate and molten aromatic amine with water containing a dispersing agent.

15. The method of preserving rubber which comprises incorporating therein a stable, finely-dispersed suspension of anti-oxidant prepared by melting together a detergent selected from the group consisting of higher aliphatic sulfonates and alkali metal salts of higher fatty acids and a substance having anti-oxidant properties and contacting the resulting product with water containing a dispersing agent.

16. Stabilized rubber having incorporated therein a stable, finely-dispersed suspension of anti-oxidant prepared by incorporating an alkali metal salt of a higher fatty acid in molten phenylnaphthylamine and dispersing the resulting product of alkali metal salt of a higher fatty acid in phenylnaphthylamine in water containing sodium alginate.

17. Stabilized rubber having incorporated therein a stable, finely-dispersed suspension of anti-oxidant prepared by incorporating a detergent selected from the group consisting of higher aliphatic sulfonates and alkali metal salts of higher fatty acids into phenylnaphthylamine at a temperature which is above the melting temperature of the phenylnaphthylamine and contacting the resulting product with water containing a dispersing agent.

18. Stabilized rubber having incorporated therein a stable, finely-dispersed suspension of anti-oxidant prepared by melting together a higher aliphatic sulfonate and an aromatic amine and contacting the resulting product of higher aliphatic sulfonate in aromatic amine with water containing a dispersing agent.

19. Stabilized rubber having incorporated therein a stable, finely-dispersed suspension of anti-oxidant prepared by melting together a detergent selected from the group consisting of higher aliphatic sulfonates and alkali metal salts of higher fatty acids and a rubber anti-oxidant and contacting the resulting product with water containing a dispersing agent.

JEROME R. VINOGRAD.